United States Patent [19]
Townsend

[11] 3,942,789
[45] Mar. 9, 1976

[54] UNIFORM PRESSURE DISTRIBUTING SELF-LEVELING PINCH ROLL FOR MAGNETIC CARD TRANSPORT SYSTEM

[75] Inventor: Robert H. Townsend, Richardson, Tex.

[73] Assignee: Xerox Corporation, Stamford, Conn.

[22] Filed: Oct. 7, 1974

[21] Appl. No.: 512,580

[52] U.S. Cl. ................ 271/274; 226/177; 226/180; 226/187; 271/DIG. 9
[51] Int. Cl.² .......................................... B65H 5/06
[58] Field of Search ...... 271/274, 273, 272, DIG. 9, 271/251, 264, 80, 3, 250, 248; 226/177, 187, 180; 198/167

[56] References Cited
UNITED STATES PATENTS

| | | |
|---|---|---|
| 2,535,234 | 12/1950 | Schwartz.......................... 226/177 X |
| 3,561,660 | 2/1971 | Nicol et al. .......................... 226/187 |
| 3,704,360 | 11/1972 | McFadden..................... 271/DIG. 9 |

Primary Examiner—John J. Love
Assistant Examiner—Bruce H. Stoner, Jr.

[57] ABSTRACT

A magnetic card transport subsystem for an electronic typewriter comprises a reversible drive roll and a co-acting pinch roll which form a nip through which a magnetic card is passed. The drive roll and pinch roll coact to move the card in opposite directions. The pinch roll is so mounted that it can rock and be self-leveling to permit the full width of the pinch roll to engage the card and uniformly distribute pressure thereto. A mechanism for adjusting the pinch roll for alignment purposes is also provided.

9 Claims, 6 Drawing Figures

UNIFORM PRESSURE DISTRIBUTING SELF-LEVELING PINCH ROLL FOR MAGNETIC CARD TRANSPORT SYSTEM

DESCRIPTION OF THE INVENTION

This invention concerns a magnetic card transport subsystem for an electronic typewriter which subsystem comprises a drive roll and a pinch roll which coact to form a nip to receive a magnetic card and drive the magnetic card past a magnetic head for a read or write function.

In card transport systems, quite often only a portion of the width of a pinch roll engages a magnetic card to apply pressure thereto to urge the same against the drive roll resulting in too much pressure being concentrated on the magnetic card surface engaged by the pinch roll. Ordinarily, information is placed on the surface engaged by the pinch roll during a writing function or the surface already contains information during a reading function. The pinch roll engages the same surface area for as many times as there are tracks when the same pinch roll is used for driving the magnetic card in only one direction or engages the same surface area for twice as many times as there are tracks when the same pinch roll is used for driving the magnetic card in opposite directions. This excess pressure can cause damage to the surface resulting in problems in writing information onto the surface or reading the information already on the surface.

Accordingly, it is an object of this invention to provide such a card transport subsystem with a pinch roll which can rock about an axis which is normal to its axis of rotation to automatically adjust to the plane of the card to enable the entire width of the pinch roll to contact the card with substantially uniform pressure and thus avoid excess pressure being exerted on the card by the pinch roll.

It is also an object of this invention to provide a simple adjustment mechanism for a pinch roll.

Other objects of this invention will become apparent from the following description with reference to the drawings wherein.

Figure 1:
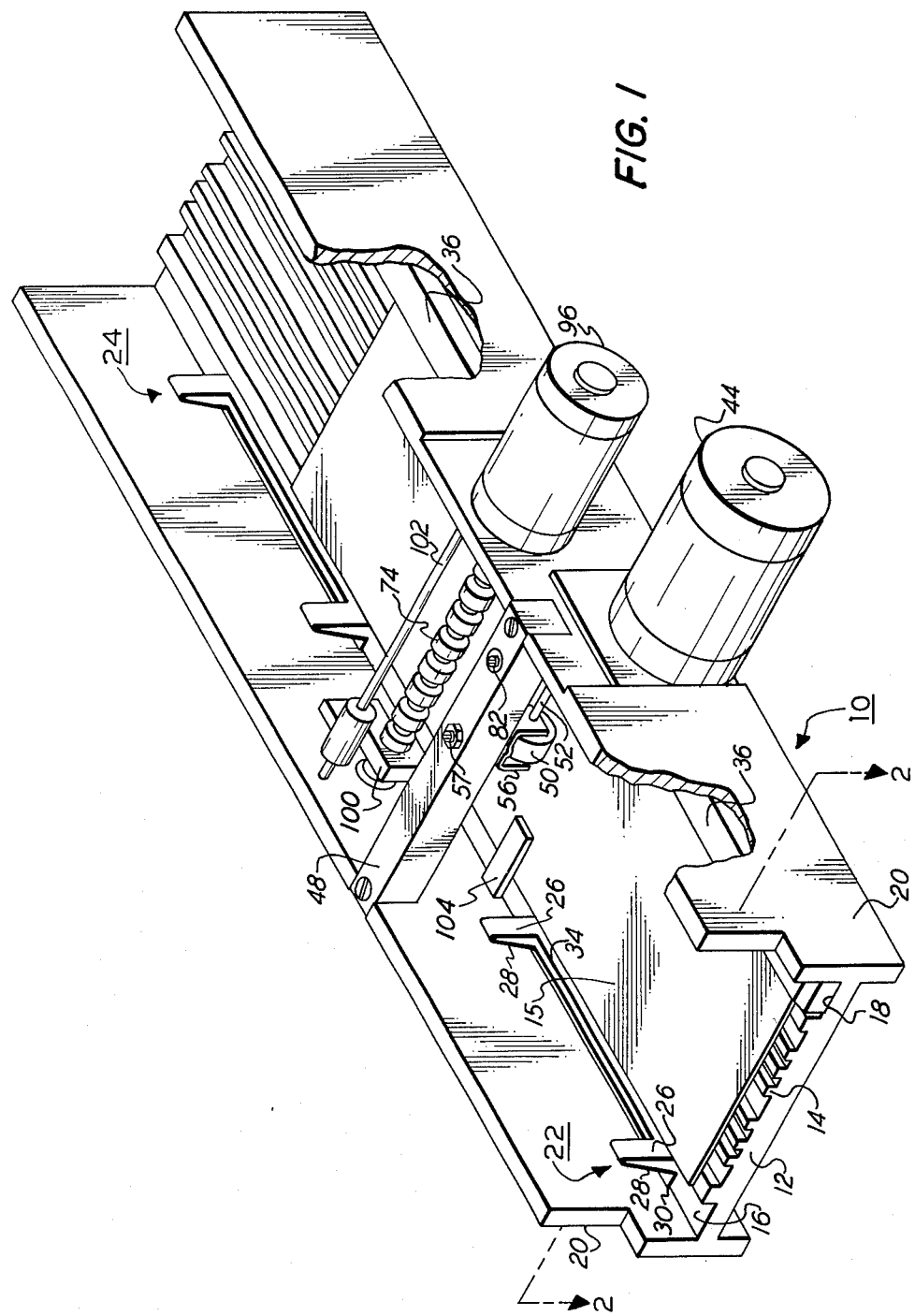
FIG. 1 is a perspective view of a card transport system.
Figure 2:
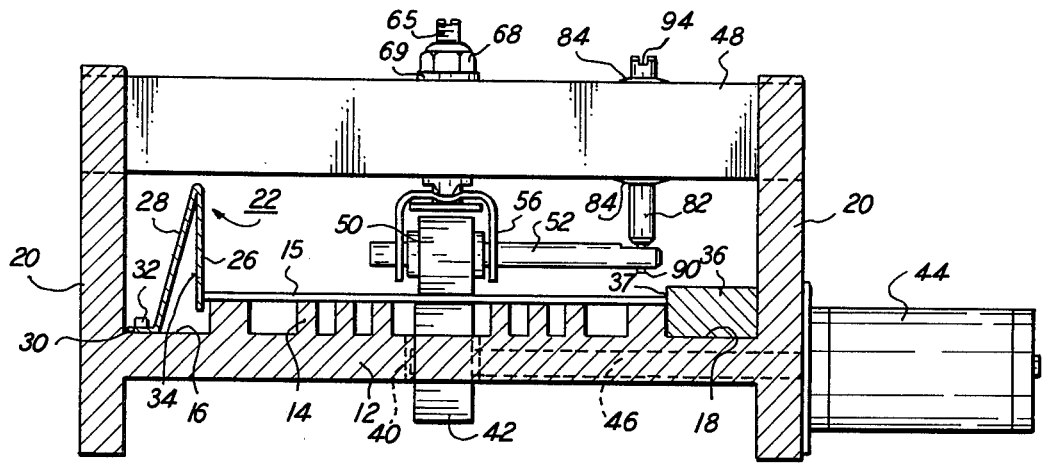
FIG. 2 is a view taken along section line 2—2 of FIG. 1.

Referring to FIG. 1, there is illustrated a card transport subsystem of an electronic typewriter system which comprises a frame 10. The frame 10 comprises a card support platform 12 having a plurality of ribs 14 for supporting a magnetic card 15. One longitudinal edge of the platform is defined by a groove 16 and the other longitudinal edge of the platform is defined by a groove 18. Projecting above the platform 12 adjacent the grooves 16 and 18 are support walls 20. Positioned in the groove 16 are a pair of resilient leaf springs 22 and 24 each of which has two U-shaped sections 26 and 28 connected to each other at the free ends of the legs of the U. The closed end 30 of section 28 is flat and is located in the groove 16 and is secured by screws 32 to the platform 12. The closed end 34 of section 26 is flat and lies in a plane which is approximately normal to the platform with the bottom edge thereof extending below the ribs 14 into the groove 16. The spring is so constructed that section 26 is biased away from section 28.

A guide bar 36 is located in the groove 18 and secured to the platform 12. The guide bar extends substantially above the ribs 14 to provide a guide surface 37 thereabove for a longitudinal edge of the card 15. An opening 40 is provided in the platform 12 and receives a portion of a resilient drive roll 42 therein which is so located that a plane tangential to the periphery of the roll portion extending through the opening 40 will be substantially coincident with the plane of the top of the ribs 14 to prevent possible deformation of or lifting of the card 15 when the card is driven by the drive roll 42. A D.C. motor 44 is secured to one wall 20 and has a drive shaft 46 operably connected to the drive roll 42 by any well-known means to alternately drive the roll 42 in opposite directions.

Figure 3:
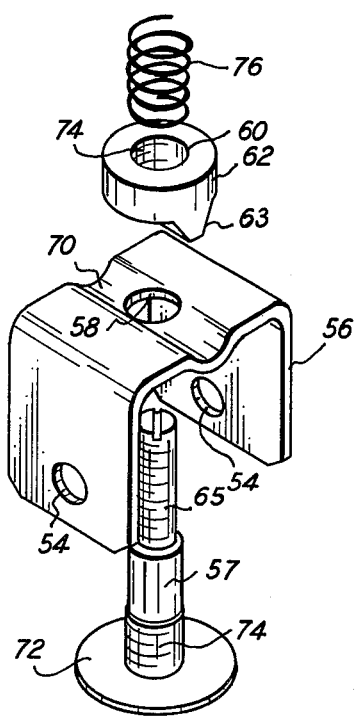
FIG. 3 is an exploded view of a support mechanism for a pinch roll.
Figure 4:
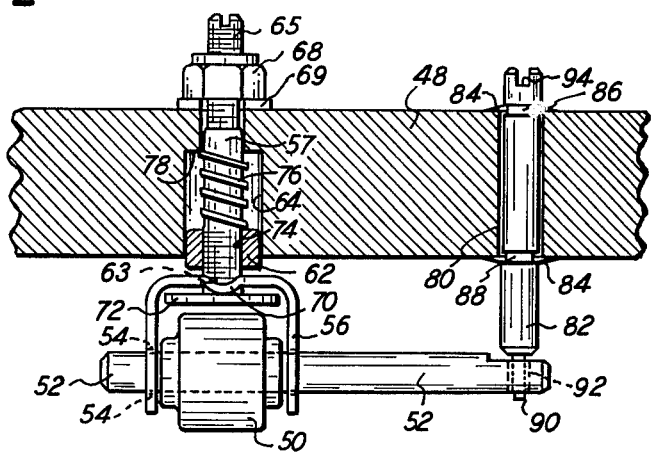
FIG. 4 is a section view of the pinch roll support shown in FIG. 1.
Figure 5:
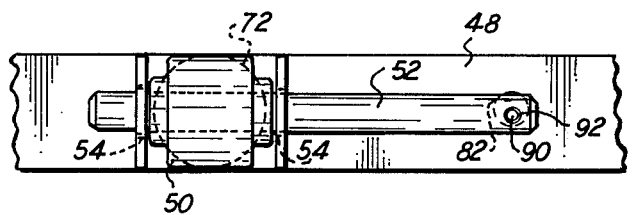
FIG. 5 is a bottom view of FIG. 4.

Referring to FIGS. 3–5, a support bar 48 for a pinch roll assembly is secured to the walls 20. A pinch roll 50 is rotatably mounted on a rod 52 which extends therethrough and through openings 54 in a U-shaped support member 56. A T-shaft 57 extends through a central opening 58 in the support bracket 56, through a central opening 60 in a bearing member 62, through a stepped bore 64 in the support bar 48. A threaded end 65 of the T-shaft extends beyond the bore 64 and has a locknut 68 thereon. A stop washer 69 surrounds the threaded end of the shaft and is slidably interposed between the nut and the top surface of the support bar 48 surrounding the bore 64. The support bracket 56 has a shallow depression 70 which extends transversely across the closed end of the bracket 56 and the annular bearing member 62 has an extended projecting transverse portion 63 in contact with and corresponding to the depression 70. The projection 63 is deeper than depression 70 to allow a rocking contact between the contacting surfaces. This will allow bracket 56 to rock relative to the bearing member 62 about an axis which is the line of contact therebetween. Relative rocking movement between the bracket and bearing member about an axis normal to the line of contact is prevented by the line contact therebetween. The depression 70 bears upon a portion of a flat annular head 72 of the T-shaft 57 to provide a line contact about which relative rocking movement between the bracket 56 and the shaft head may be effected. Relative rocking movement between the bracket 56 and the head 72 about an axis normal to the line of contact is prevented by the line contact therebetween. The bearing 62 is connected by cooperating threads 74 to the shaft 57 and is positioned to press the depression 70 against the head 72.

In assembling the shaft assembly, the bracket 56 is slipped over the threaded end 65 of the shaft and slid into engagement with the head 72. Thereafter the bearing member is slipped over the threaded end and brought into engagement with the threads 74, the depression 70 and 63 aligned and the member 62 tightened to press the depression 70 against the head 72. A coil spring 76 is slipped over the shaft and one end thereof bears on the bearing member 62. The shaft is then inserted into bore 64 with the threaded end 65 thereof projecting out of the bore. The washer 69 and nut 68 are then assembled onto the shaft. The other end of the spring bears against the bore shoulder 78 and is thereby compressed between the shoulder and bearing member to urge the shaft assembly downwards relative to the support bar 48. The support bar 48 is secured to the walls 20 in such a manner that the pinch roll 50 will be spaced from the drive roll 42 by less than the thickness of the card 15. For instance, the spacing may be on the order of 0.003 inch while the thickness of the card is 0.008 inch. This is to prevent contact between the two rolls when the machine is not in use to avoid producing depressions in the resilient drive roll 42 since any depression in the drive roll will cause a jerky motion affecting reading the card or writing on the card or subsequent correlation of the two functions. When a card is inserted into the nip between the pinch roll 50 and drive roll 42, the pinch roll 50 is moved vertically relative to the support bar 48 against the force of the spring 76 to accommodate the thickness of the card. The spring 76 maintains sufficient pressure on the card 15 to effect a sufficient friction driving force between the card and drive roll 42.

Another vertical bore 80 is located in the support bar 48 which receives an adjusting shaft 82 therein. A pair of bowed E-rings 84 is slipped into respective grooves 86 and 88 on the shaft 82 and bear against the upper surface and lower surface surrounding the bore 80 to secure the shaft 82 to the support bar 48 for relative rotation therewith but provide a locking function by friction following rotation of the shaft for adjustment. An eccentric projection 90 extends from the lower end of the shaft and projects into an opening 92 in the rod 52. The upper end of the shaft 82 has a slot 94 therein for receiving a screwdriver. There is a loose enough fit between the rod 52 and the bracket openings 54 and the pinch roll 50 to allow for axial shifting of the rod relative thereto. Rotation of the adjusting shaft 360° will shift the rod 52 first in one direction and then in the opposite direction to rotate the bracket and thereby the shaft 57 in alternate directions. Also, the rod 52 itself will be shifted axially relative to the bracket and pinch roll in alternate directions by the eccentric pin 90. The manufacturing tolerances are such that when the support bar is secured to the walls 20, the pinch roll 50 will be substantially aligned with the guide members 36. The adjusting shaft is used to fine-tune the alignment of the roll by running the magnetic card back and forth while turning the adjusting shaft until the card continuously aligns to the guide member. Normally, the pinch roll may be rotated about 35 minutes in each direction. If desired, manufacturing tolerances may be loosened and the opening 92 may be sufficiently larger than the projection 90 to provide a slight lost motion connection to allow the T-shaft 57 and thereby the pinch roll to rotate slightly (between 1° and 6°) to self-align. This feature does not form a part of this invention and is more fully disclosed in U.S. application Ser. No. 512,581, entitled "Self-aligning Pinch Roll For Magnetic Card Transport System", filed concurrently herewith (common assignee).

Figure 6:
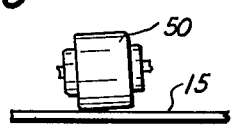
FIG. 6 is a view of a pinch roll and magnetic card wherein only a portion of the width of the pinch roll engages the card.

By mounting the bracket 56 onto the shaft 57 for rocking movement about an axis corresponding to the line contact between the depression 70 and the shaft head 72, the peripheral surface of the pinch roll is allowed to align or level with the surface of the card to fully contact the same and apply a uniform pressure across the contacting surface. This is most desirable since the pinch roll contacts the surface upon which information is to be stored or is stored and any excess concentration of pressure can damage the surface. Damage can occur when the pinch roll surface is at an angle with the plane of the card (depicted in FIG. 6) and the load exerted by the spring onto the pinch roll is transferred to the card surface by a minor portion of the pinch roll surface.

A step motor 96 is connected to one of the walls 20 and a worm gear 98 extends therefrom across the platform and is journalled into the other wall. A magnetic head 100 is operatively secured to a guide rod 102 and to the worm gear 98 for stepped slidable movement across the platform 12. A light emitting diode (LED) detector 104 is located to detect the leading edge of the card which then actuates a control circuit. The control circuit is designed to place the magnetic head 100 and the motor 44 into a read or write condition depending upon the function selected by an operator. In the write condition, an operator types one line of information into a buffer system to store the information. When the operator hits the carriage return button, the motor 44 is actuated to rotate the drive roll 42 to drive the card 15 forwards and simultaneously bits of information are fed from the buffer to the magnetic head 100 and recorded on the card. After one line of information is recorded, the motor 44 is reversed to reverse rotation of the drive roll 42 and thereby move the card in the reverse direction while simultaneously motor 96 is actuated to move the magnetic head 100 transversely to the next track. The same procedure is followed after the operator types the next line and pushes the carriage return button. In the read condition, the motor 44 is continuously actuated to alternately move the card 15 in opposite directions. The magnetic head reads a track of bits during forward movement of the card 15 therepast and the card 15 is moved in the reverse direction while the magnetic head is moved transversely to the next track by motor 96. A sheet of paper is typed automatically in accordance with the bits of information on the card 15 during reading thereof.

In operation, the card 15 is placed onto the platform 12. As the leading edge thereof slides past the LED 104, the control circuits are readied for activation and further movement of the card brings the leading edge thereof to the nip between the rolls 42 and 50 raising the pinch roll 50 against the force of spring 76 to accommodate the thickness of the card. When the motor 44 is activated either by depressing a carriage return button or by depressing the appropriate button for reading the card, the drive roll is rotated in a clockwise direction (FIG. 1) to drive the card forwards. The side edge of the card engages leaf spring 22 which exerts a force on the card to urge the opposite edge thereof against the guide rail 36 to maintain registration for reading and writing functions. As the card continues its forward movement, it moves under the magnetic head 100 for either the printing or reading function and engages the spring 24 which in conjunction with spring 22 urges the card toward the guide rail. After the card has moved forward to receive a certain quantity of data bits from the magnetic head or a certain quantity of data bits have been read by the magnetic head, the control circuit will act to reverse the motor 44 to reverse the rotation of the drive wheel 42 and thereby move the card rearwards to its next read or write position. At the same time, step motor 96 is activated to transversely move the magnetic head 100 to the next track.

What is claimed is:

1. A card transport system comprising a card support member having a top surface, an opening in said member extending through said top surface, a drive roll supported for rotation about an axis which is generally parallel to said top surface and having a portion thereof extending into said opening with a plane tangent to the periphery thereof being substantially coplanar with said top surface, means for driving said roll, a shaft extending in a direction generally normal to said top surface and having an annular flange at the lower end thereof, a pinch roll support member operatively connected to said shaft and comprising a U-shaped bracket forming a pair of spaced legs extending from a closed end, an opening in said closed end through which said shaft extends, a portion of the closed end of said bracket engaging a portion of said flange, said portions of said bracket and said flange being so constructed to form an axis about which said shaft and said bracket can relatively move, said axis being generally normal to said shaft, a pinch roll mounted on said legs for rotation about an axis generally normal to said rocking axis and generally parallel to said top surface, said pinch roll being located above said top surface opposite said drive roll and forming a card receiving nip with said drive roll, and resilient means urging said pinch roll towards said drive roll.

2. The structure as recited in claim 1 further comprising means for limiting movement of said pinch roll toward said drive roll so that said pinch roll is slightly spaced from said drive roll.

3. The structure as recited in claim 1 wherein one of said portions are flat and the other of said portions is depressed to form said axis.

4. The structure as recited in claim 1 further comprising shaft support means, said shaft support means including an opening having vertically spaced apart shoulders, said shaft extending through said shaft support means opening past said shoulders, spring support means extending transversely from said shaft, said resilient means comprising a coil spring surrounding said shaft and having one end operatively connected to one of said shoulders and the other end operatively connected to said spring support means on said shaft to bias said shaft in a downward direction.

5. The structure as recited in claim 4 wherein said spring is compressed between the upper one of said shoulders and said spring support means.

6. A card transport system comprising a card support member having a top surface, an opening in said member extending through said top surface, a drive roll supported for rotation about an axis which is generally parallel to said top surface and having a portion thereof extending into said opening with a plane tangent to the periphery thereof being substantially coplanar with said top surface, means for driving said roll, pinch roll support means connected to said card support member, a first vertical shaft rotatably connected to said pinch roll support means, a pinch roll mounted on the lower end of said first shaft for rotation about an axis transverse to said first shaft, a transversely extending arm operatively connected to said shaft for rotating the same, a second vertical shaft rotatably mounted on said pinch roll support means and laterally spaced from said first shaft, a portion of the lower end of said second shaft engaging a portion of said arm, said portions of said arm and said second shaft being so constructed and arranged to rotate said first shaft in opposite directions during rotation of said second shaft in one direction, said pinch roll being located above said top surface opposite said drive roll and forming a card receiving nip with said drive roll, and resilient means urging said pinch roll towards said drive roll.

7. The structure as recited in claim 6 further comprising means for limiting movement of said pinch roll toward said drive roll so that said pinch roll is slightly spaced from said drive roll.

8. The structure as recited in claim 6 wherein one of said portions is an opening and the other of said portions is a projection, and one of said portions is arranged eccentrically relative to the axis of said second shaft.

9. The structure as recited in claim 6 wherein said pinch roll is mounted on said first shaft for movement relative thereto about an axis which is generally perpendicular to the axis of rotation of said pinch roll and generally parallel to said top surface.

* * * * *